US008113940B2

(12) United States Patent
Hornik

(10) Patent No.: US 8,113,940 B2
(45) Date of Patent: Feb. 14, 2012

(54) GAMING MACHINE WITH ELEMENT SELECTION FEATURE

(75) Inventor: Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1589 days.

(21) Appl. No.: 11/196,127

(22) Filed: Aug. 3, 2005

(65) Prior Publication Data

US 2006/0030398 A1 Feb. 9, 2006

Related U.S. Application Data

(60) Provisional application No. 60/599,211, filed on Aug. 5, 2004.

(51) Int. Cl.
*A63F 13/00* (2006.01)

(52) U.S. Cl. .......... 463/20

(58) Field of Classification Search .......... 463/20
See application file for complete search history.

(56) References Cited

U.S. PATENT DOCUMENTS

| | | | | |
|---|---|---|---|---|
| 6,159,098 | A | 12/2000 | Slomiany et al. | 463/25 |
| 6,190,255 | B1 | 2/2001 | Thomas et al. | 463/20 |
| 6,315,660 | B1 | 11/2001 | DeMar et al. | 463/16 |
| 6,347,996 | B1 | 2/2002 | Gilmore et al. | 463/19 |
| 6,358,147 | B1 | 3/2002 | Jaffe et al. | 463/20 |
| 6,364,766 | B1 | 4/2002 | Anderson et al. | 463/16 |
| 6,428,412 | B1 | 8/2002 | Anderson et al. | 463/9 |
| 6,443,837 | B1 | 9/2002 | Jaffe et al. | 463/16 |
| 6,585,591 | B1 * | 7/2003 | Baerlocher et al. | 463/25 |
| 6,592,457 | B1 | 7/2003 | Frohm et al. | 463/16 |
| 6,607,437 | B2 | 8/2003 | Casey et al. | 463/16 |
| 6,685,560 | B1 | 2/2004 | Hughes | 463/16 |
| 6,817,944 | B2 * | 11/2004 | Kaminkow et al. | 463/16 |
| 2005/0075156 | A1 * | 4/2005 | Seelig et al. | 463/1 |

* cited by examiner

*Primary Examiner* — Dmitry Suhol
*Assistant Examiner* — Malina K Rustemeyer
(74) *Attorney, Agent, or Firm* — Nixon Peabody LLP

(57) ABSTRACT

A gaming machine and method of conducting a wagering game are disclosed. The method comprises displaying a plurality of selectable elements and an indicator defining an area having a size adapted to contain at least one of the plurality of selectable elements. The size of the area defined by the indicator is variable during the wagering game. The variation of the size of the area defined by the indicator varies a quantity of the selectable elements contained within the indicator. The indicator is moved to vary which of the plurality of selectable elements are contained within the indicator. The indicator is stopped with one or more of the plurality of selectable elements contained within the indicator. An award is provided based on the one or more selectable elements contained within the indicator when the indicator is stopped.

20 Claims, 7 Drawing Sheets

GAMING MACHINE WITH ELEMENT SELECTION FEATURE

CROSS REFERENCE TO RELATED APPLICATIONS

This application claims priority to U.S. provisional application Ser. No. 60/599,211, filed on Aug. 5, 2004. The disclosure of the aforementioned provisional application is incorporated by reference in its entirety herein.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and, more particularly, to a gaming machine including an element selection feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by increasing the entertainment value and excitement for the player.

One concept employed to increase the entertainment value of a reel spinning game is a bonus feature, providing the player with a different game experience occurring randomly during play of the basic game. Typically, a predetermined symbol or set of symbols in the basic reel game triggers a bonus feature. Bonus features take on a variety of themes and in many cases require the player to make choices that typically instill a feeling of control or self-destiny. Often times, games make random selections during bonus features and this method offers excitement because the player anticipates the outcome but cannot be sure because the result is controlled by the element of chance.

A concept often found in bonus features today is the random selection of individual animated characters or elements that potentially provide the player with a winning outcome. In many cases, the element selection results in immediate feedback to the player of an award, a loss, or the completion of the bonus feature. In many games, the player is awarded a certain number of selections and when the selections are completed, the bonus feature ends.

An alternative to the individual element selection method that allows multiple elements to be selected at one time would increase the entertainment value of the bonus feature.

SUMMARY OF THE INVENTION

According to one embodiment of the present invention, a method of conducting a wagering game on a gaming machine is disclosed. The method comprises displaying a plurality of selectable elements and an indicator defining an area having a size adapted to contain at least one of the plurality of selectable elements. The size of the area defined by the indicator is variable during the wagering game. The variation of the size of the area defined by the indicator varies a quantity of the selectable elements contained within the indicator. The indicator is moved to vary which of the plurality of selectable elements are contained within the indicator. The indicator is stopped with one or more of the plurality of selectable elements contained within the indicator. An award is provided based on the one or more selectable elements contained within the indicator when the indicator is stopped.

According to another embodiment of the present invention a gaming machine for conducting a wagering game is disclosed. The gaming machine comprises at least one display and a controller coupled thereto. The at least one display displays the wagering game that includes a game feature. The game feature includes a plurality of selectable elements and an indicator defining an area having a size adapted to contain at least one of the plurality of selectable elements. The size of the area defined by the indicator being variable and determining a quantity of the selectable elements contained within the indicator. The controller is operative to vary the size of the area defined by the indicator, (ii) move the indicator to vary which of the plurality of selectable elements are contained within the indicator, and (iii) stop the indicator with one or more of the plurality of selectable elements contained within the indicator.

According to yet another embodiment of the present invention a method of conducting a wagering game on a gaming machine is disclosed. The method comprises displaying a plurality of selectable elements and an indicator defining an area for containing one or more of the plurality of selectable elements. The size of the area is varied to vary a quantity of the plurality of selectable elements identified with the indicator. The plurality of selectable elements that are identified with the indicator is changed. An award is provided after the varying and changing based on the one or more selectable elements identified by the indicator.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
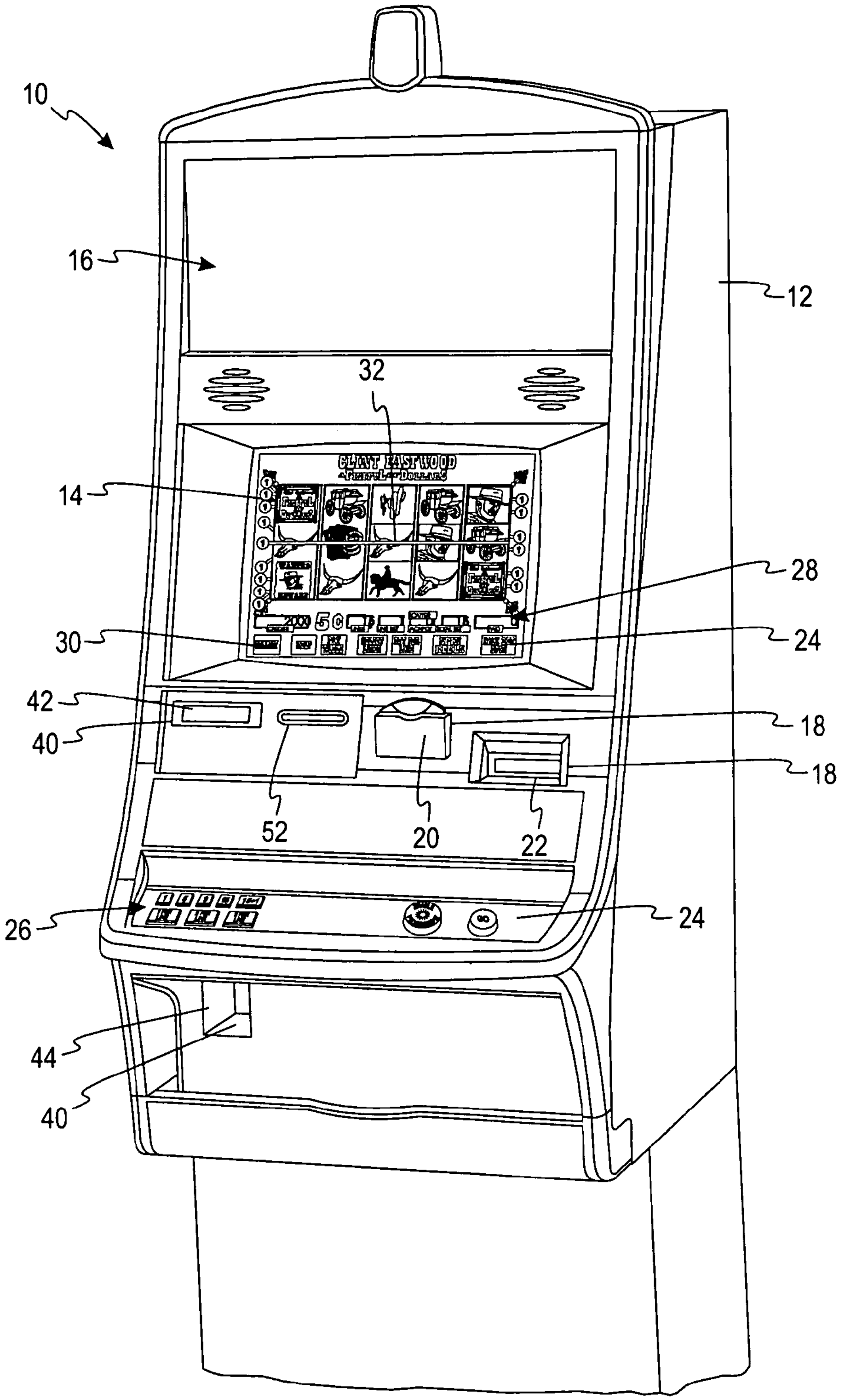
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
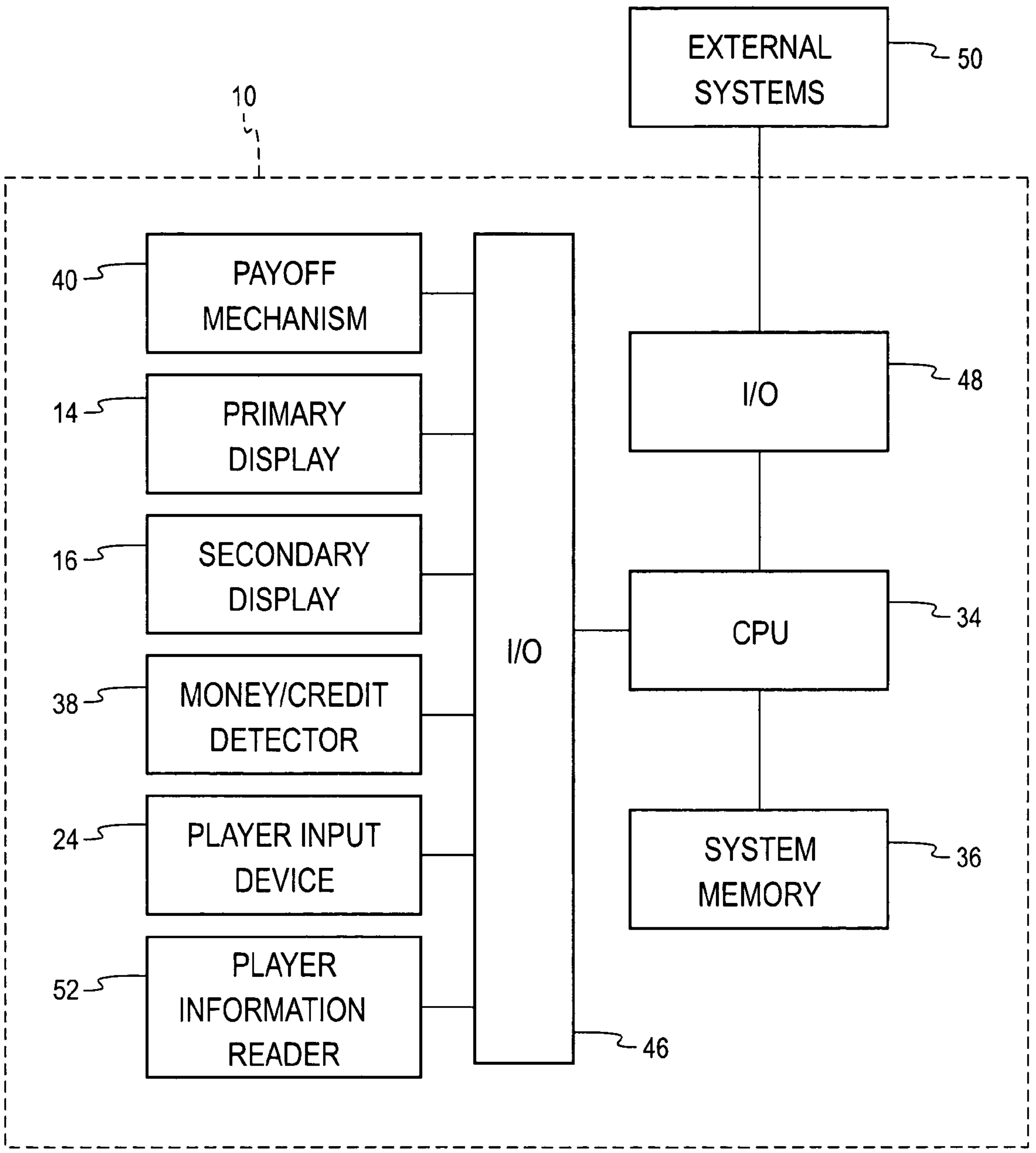
FIG. 2 is a block diagram of a control system suitable for operating the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the I/O circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
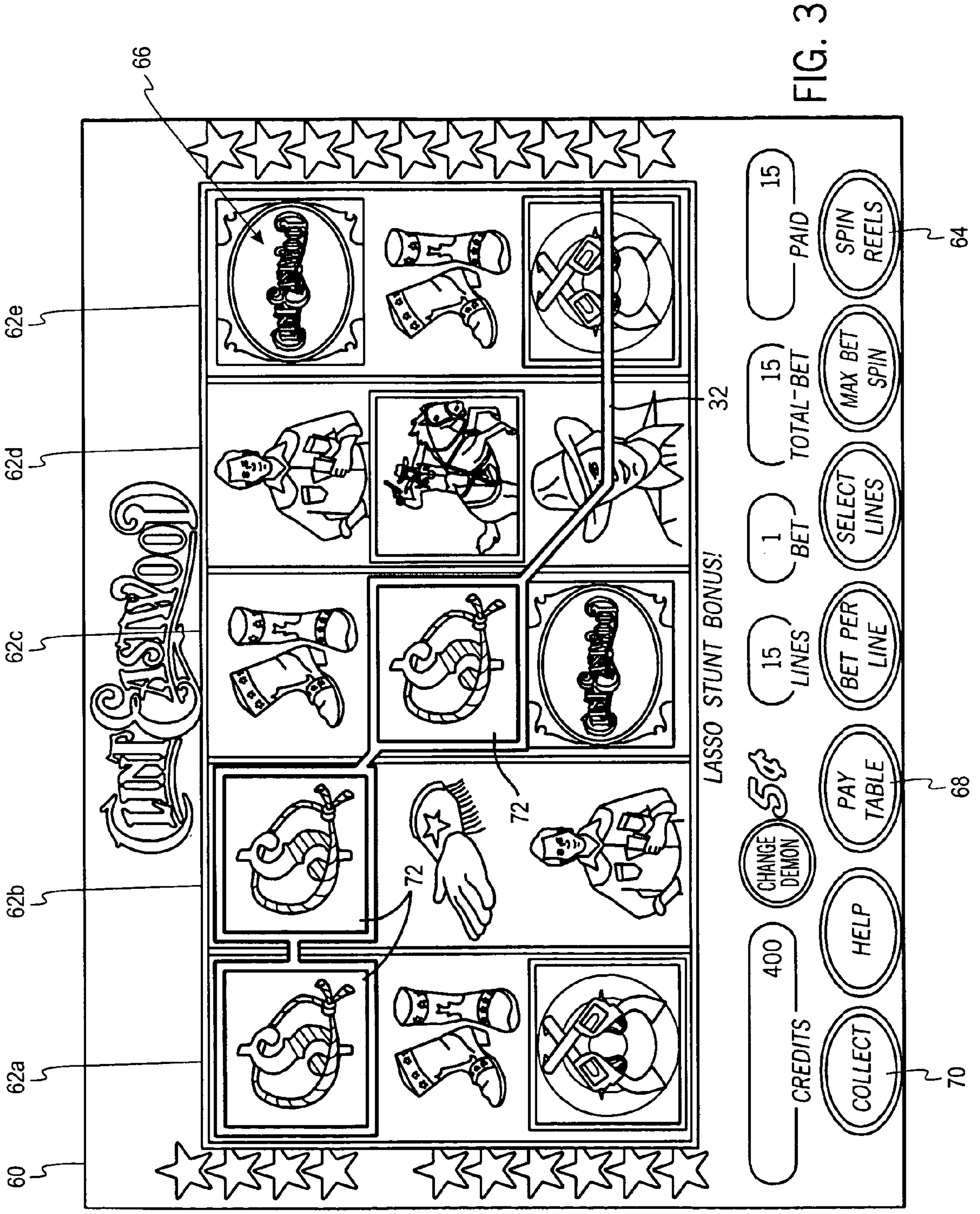
FIG. 3 is a display image associated with a basic slot game and showing a symbol combination for triggering a bonus feature.

Referring back to FIG. 1 and also to FIG. 3, to play the reel slot game, a player selects a number of pay lines to play and places a wager on the selected lines using the player input device 24 and/or the touch screen 28. In response to pressing a "Spin Reels" button 64, the controller 34 (FIG. 2) spins and randomly stops a plurality of simulated reels 62*a-e* on a game screen 60 to place a plurality of symbols 66 on the reels in visual association with the at least one pay line 32. Other mechanisms, such as a handle, may be used to set the reels 62*a-e* in motion. The number of reels and pay lines may be varied to be more or less than what is illustrated. The controller 34 uses a random number generator to select a game outcome (e.g., "basic" game outcome) corresponding to a particular set of reel 62*a-e* "stop positions." The controller 34 then causes each of the reels 62*a-e* to stop at the appropriate stop position. The symbols 66 are displayed on the reels to graphically illustrate the reel 62*a-e* stop positions and indicate whether the stop positions of the reels 62*a-e* represent a winning game outcome.

Winning basic game outcomes (e.g., symbol combinations resulting in payment of coins or credits) are identifiable to the player by a pay table. The pay table may be affixed to the gaming machine 10 and/or displayed by the primary display 14 and/or the secondary display 16 in response to a command by the player (e.g., by pressing a "Pay Table" button 68). A winning basic game outcome occurs when the plurality of symbols 66 appearing on the reels 62*a-e* along a pay line 32 correspond to one of the winning combinations on the pay table. A winning combination, for example, could be a number of matching symbols 66 along an active pay line 32, where the award is greater as the number of matching symbols 66 along the pay line 32 increases. If the displayed symbols 66 stop in a winning combination, the game credits the player an amount corresponding to the award in the pay table for that combination multiplied by the number of credits wagered on the active pay line 32. The player may collect the amount of accumulated credits by pressing a "Collect" button 70.

The present invention provides a feature that increases the number of elements randomly selected in a bonus feature. FIG. 3 is a game screen 60 of a five-reel video slot game. According to one embodiment, a bonus feature is triggered when three or more identical bonus symbols 72 of a certain type are displayed on an active pay line 32. In this example, the bonus symbols 72 are lassoed dollar signs that have appeared in the correct position and the bonus feature is started. The bonus feature is announced to the player either visually, audibly, or both.

Figure 4:
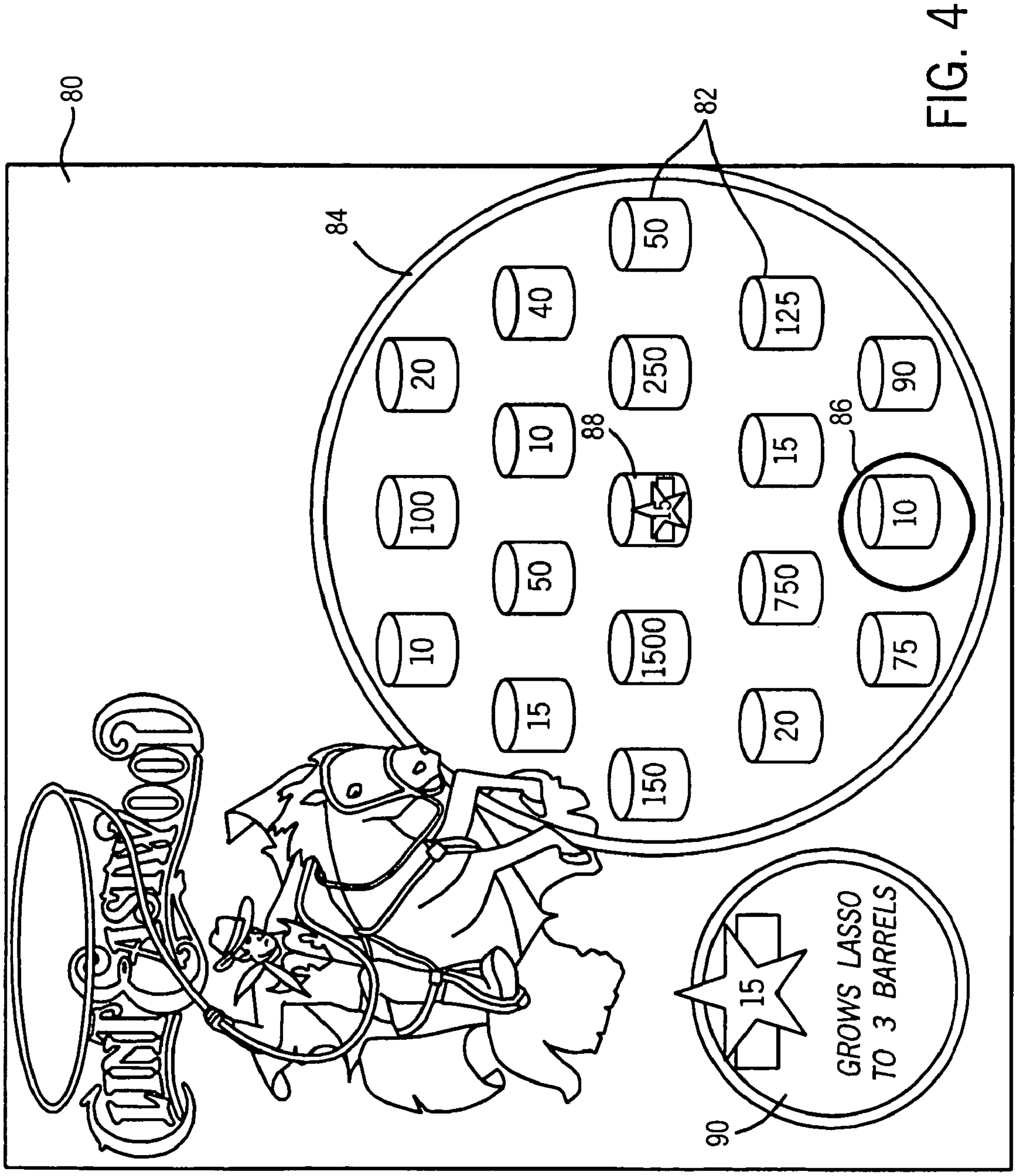
FIG. 4 is a display image showing a bonus feature with a group of elements and an individual, randomly selected element.
Figure 5:
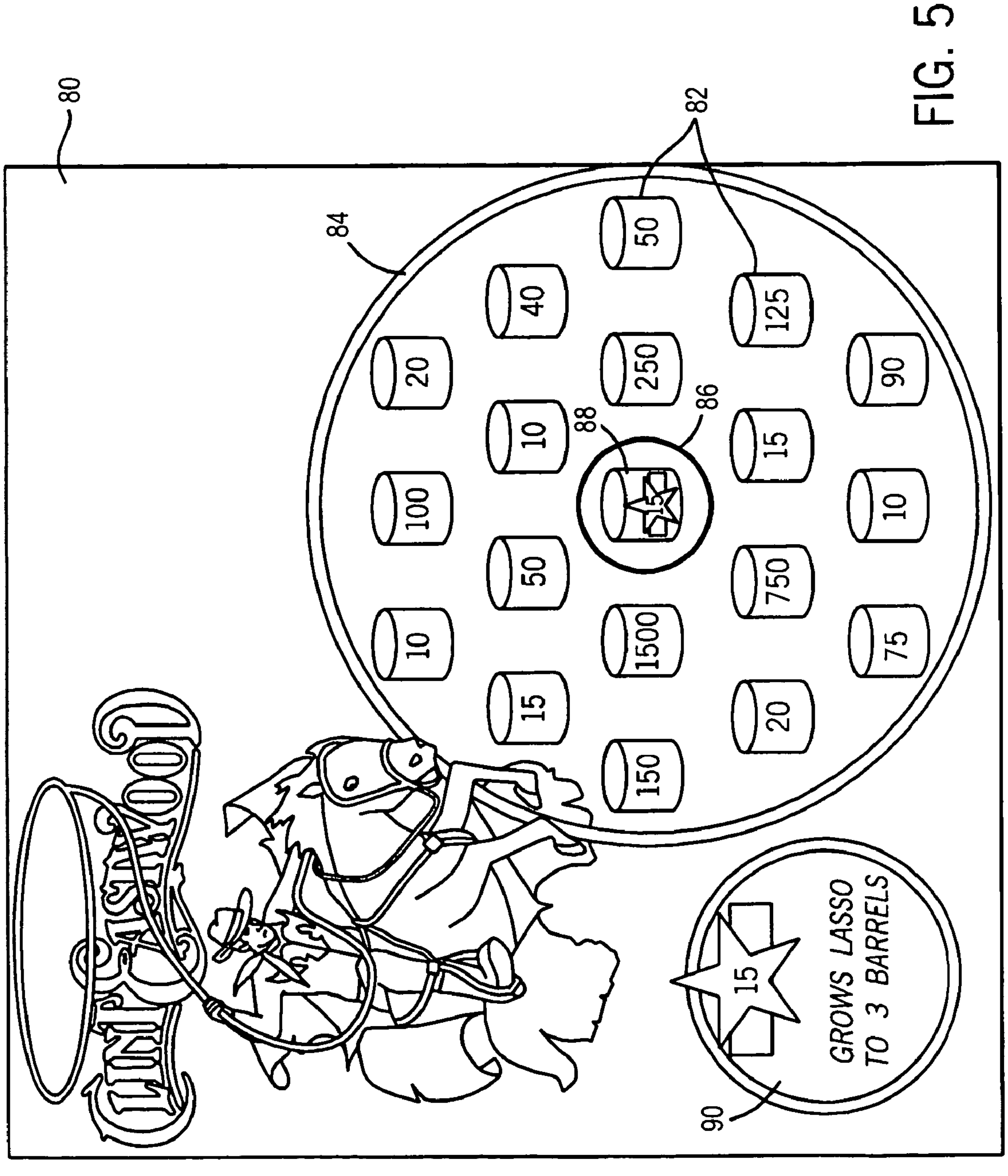
FIG. 5 is a display image showing the bonus feature and a special element that was randomly selected that increases the number of elements to be randomly selected.

Turning now to FIG. 4, once the bonus feature has been initiated, a secondary game screen 80 is displayed on one or both of the primary display 14 and the secondary display 16. In the embodiment illustrated in FIG. 4, a group of selectable elements 82 is displayed in a selection area 84 represented as a circle area or ring in the illustrated embodiment. The selectable elements 82 are represented as barrels according to one embodiment. An identifier 86, such as a circle or "lasso," begins moving randomly around the selection area 84. The identifier 86 indicates to the player which of the selectable elements 82 have been designated at any particular time. Each time the indicator 86 stops on a selectable element 82, the award associated with the selectable element is added to the player's cumulative credit total. A special selectable element 88 is displayed within the selection area 84. In the illustrated embodiment, the special selectable element 88 is presented in the middle of the group of selectable elements 82. However, it should be readily apparent that the position of this special selectable element 88 can be displayed in any position within the selection area 84 in any relation to the selectable elements 82. According to one embodiment, a secondary display area 90 may be used to define the purpose of the special selectable element 88. As illustrated in FIG. 4, the special selectable element 88 awards the player fifteen credits and increases the next random selection to three selectable elements 82. FIG. 5 shows the indicator 88 having selected the special selectable element 88.

Figure 6:
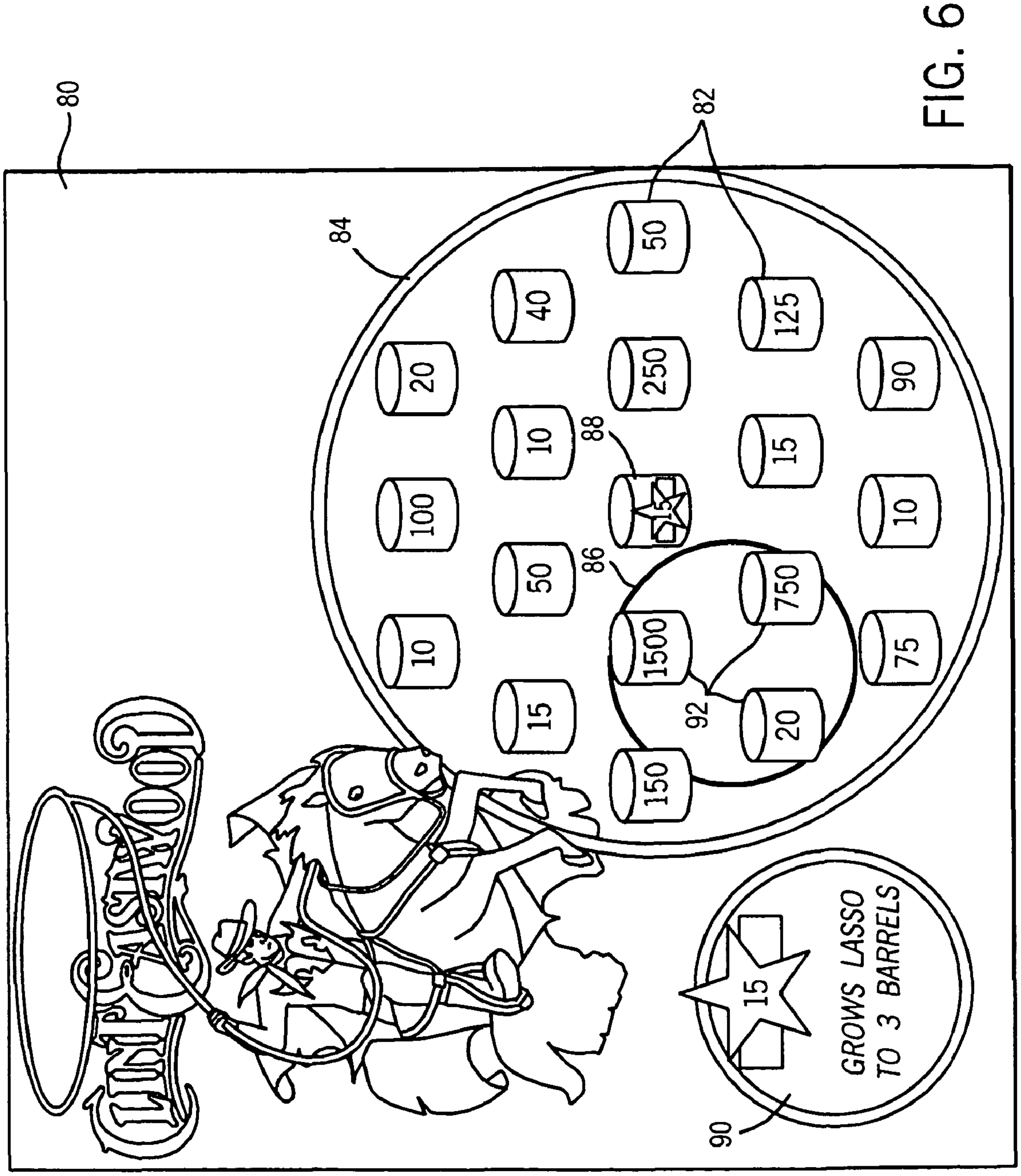
FIG. 6 is a display image showing the bonus feature and the increased number of elements selected based on the special element selected in FIG. 5.

Referring also to FIG. 6, the indicator 86 is illustrated after having expanded to allow the random selection of a group of three 92 of the selectable elements 82. In this example, three of the selectable elements 82 have been selected by the indicator 86 resulting in an award of 2270 credits being provided to the player. Depending on the number of selections awarded the player at the beginning of the bonus feature, the selections either continue or the bonus feature ends and the cumulative total from the bonus feature is added to the player's credit meter.

As will be appreciated by those with ordinary skill in the art, the element selection feature could also be presented in a basic game. Both basic and bonus features could present selectable elements 82 with a number of prizes containing null or zero values.

While the present invention has been described with reference to one or more particular embodiments, those skilled in the art will recognize that many changes may be made thereto without departing from the spirit and scope of the present invention.

For example, the awards contained on the selectable elements 82 could be hidden and the player could control the selection of the elements 82—including the expanded selection—by utilizing the player input device 24 and/or the touch screen 28 for example. One of the selectable elements 82 could have an additional selection number, multipliers, or an end bonus feature symbol displayed thereon. The indicator 86 could be presented as a randomly sized selection image, either from the beginning of the bonus feature or dynamically throughout the round. The selectable elements 82 can be stationary or move in a static or random fashion. In this embodiment, the indicator 86 could be controlled by the player using personal skill to try and select the moving selectable elements 82.

Figure 7:
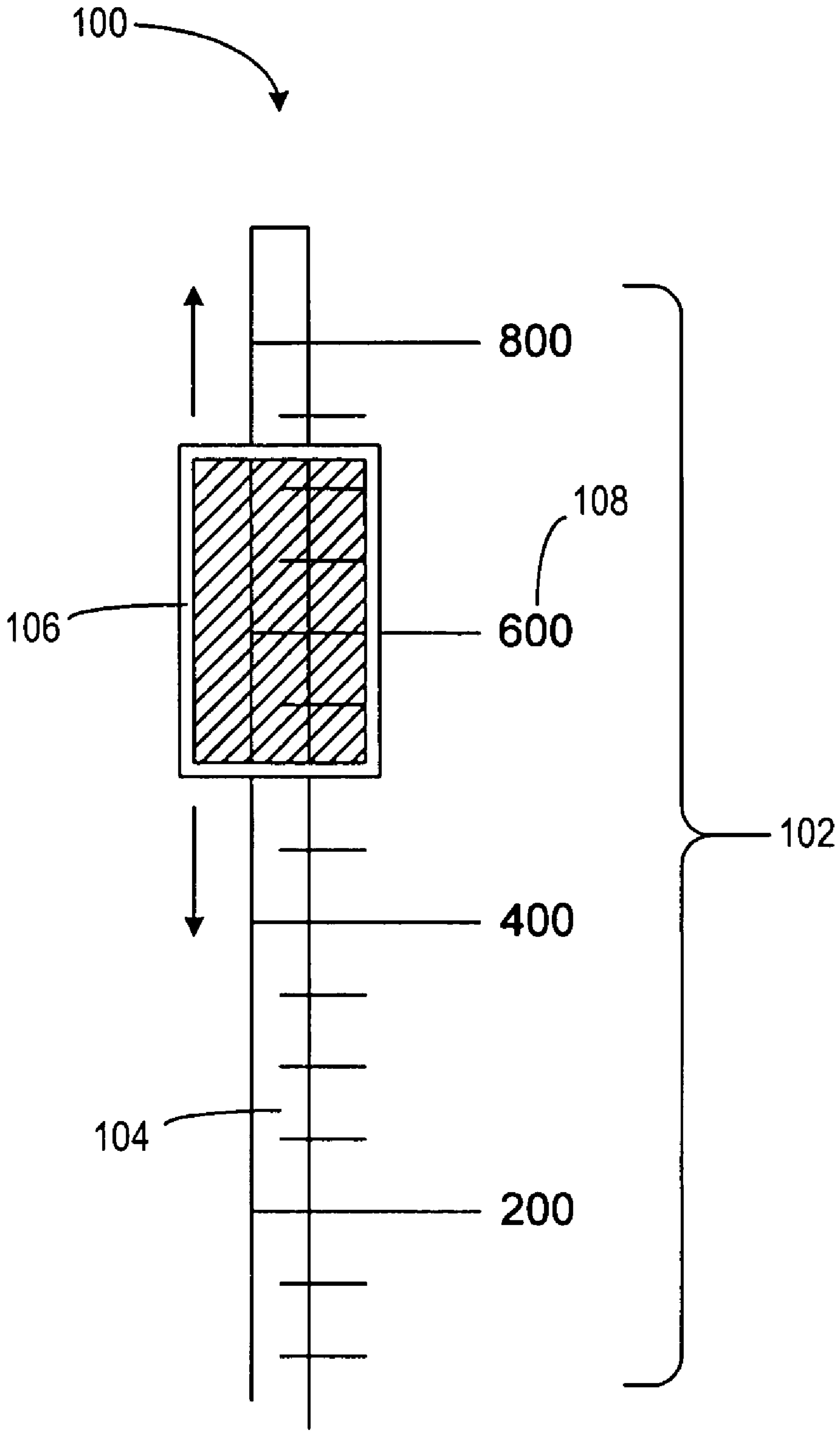
FIG. 7 is a front view of a range meter used to display a winning outcome in a range boundary.

In another embodiment, a range device is used to specify a group of numbers on a bonusing meter. Turning now to FIG. 7, a range meter 100 with a displayed number range 102 is depicted. In the illustrated embodiment, the number range 102 is displayed on a vertical meter post 104. A range boundary 106 is positioned to move up and down the meter post 10 in accordance to events occurring on the wagering game. When the range boundary stops in a certain position, in this example, over a range of numbers including the number "600" 108, the player is awarded one or more prizes from within the range boundary 106. While this example depicts a method of winning a prize, the range meter 100 could be used for other purposes such as collecting points for a certain bonus feature, specifying a range of numbers, one of which must be matched to be awarded a prize, or as a random group selection device to be used in a variety of bonus features.

Each of these embodiments and obvious variations thereof is contemplated as falling within the spirit and scope of the claimed invention, which is set forth in the following claims.

What is claimed is:

1. A method of conducting a wagering game on a gaming machine, comprising:

displaying a plurality of selectable elements;

displaying an indicator defining an area having a size adapted to contain at least one of the plurality of selectable elements, the size of the area defined by the indicator being variable during the wagering game, the variation of the size of the area defined by the indicator varying a quantity of the selectable elements contained within the indicator;

moving the indicator to vary which of the plurality of selectable elements are contained within the indicator;

stopping the indicator with two or more of the plurality of selectable elements contained within the indicator; and providing an award based on the two or more contained selectable elements.

2. The method of claim 1, wherein the indicator is randomly moved.

3. The method of claim 1, wherein the variation of the size of the area is random.

4. The method of claim 1, wherein the one or more contained selectable elements are associated with respective prizes, and wherein the award is based on the respective prizes.

5. The method of claim 4, wherein the respective prizes are hidden prior to stopping the indicator.

6. The method of claim 4, wherein the respective prizes are visible prior to stopping the indicator.

7. The method of claim 1, wherein the moving of the indicator is performed by a player.

8. The method of claim 1, wherein the stopping of the indicator is performed by a player.

9. A computer readable storage medium encoded with instructions for directing a gaming device to perform the method of claim 1.

10. A gaming machine for conducting a wagering game comprising:

at least one display for displaying the wagering game, the wagering game including a game feature including a plurality of selectable elements and an indicator displayed on the at least one display, the indicator defining an area having a size adapted to contain at least one of the plurality of selectable elements, the size of the area defined by the indicator being variable and determining a quantity of the selectable elements contained within the indicator; and a controller coupled to the at least one display and operative to (i) vary the size of the area defined by the indicator, (ii) move the indicator to vary which of the plurality of selectable elements are contained within the indicator, (iii) stop the indicator with two or more of the plurality of selectable elements contained within the indicator, and (iv) provide an award based on all of the two or more contained selectable elements.

11. The gaming machine of claim 10, wherein the size of the area is randomly varied by the controller.

12. The gaming machine of claim 10 further comprising an input device for receiving an input from a player, wherein the moving of the indicator by the controller is performed in response to an input by the player.

13. The gaming machine of claim 10 further comprising an input device for receiving an input from a player, wherein the stopping of the indicator by the controller is performed in response to an input by the player.

14. The gaming machine of claim 10, wherein the controller is located outside of the gaming machine.

15. The gaming machine of claim 10, wherein the controller is located on a network in communication with the gaming machine.

16. A method of conducting a wagering game on a gaming machine, comprising:

displaying a plurality of selectable elements;

displaying an indicator defining an area for containing two or more of the plurality of selectable elements, varying a size of the area of the indicator to vary a quantity of the plurality of selectable elements identified with the indicator;

changing the plurality of selectable elements that are identified with the indicator; and after the varying and changing, providing an award based on the two or more selectable elements identified by the indicator.

17. The method of claim 16, wherein each of the plurality of selectable elements that is identified is associated with a respective prize, and wherein the award is based on each respective prize.

18. The method of claim 17, wherein each respective prize is within a range specified by a range meter.

19. The method of claim 18, wherein the range is varied based on one or more outcome within the wagering game.

20. A computer readable storage medium encoded with instructions for directing a gaming device to perform the method of claim 16.

* * * * *